United States Patent
Bobb et al.

(10) Patent No.: US 9,937,766 B1
(45) Date of Patent: Apr. 10, 2018

(54) HEIGHT CONTROL LINKAGE FOR A VEHICLE CAB SUSPENSION SYSTEM

(71) Applicants: Joshua E. Bobb, Sioux Center, IA (US); Matthew C. Lohafer, Le Mars, IA (US)

(72) Inventors: Joshua E. Bobb, Sioux Center, IA (US); Matthew C. Lohafer, Le Mars, IA (US)

(73) Assignee: LINK MFG., LTD., Sioux Center, IA (US)

( * ) Notice: Subject to any disclaimer, the term of this patent is extended or adjusted under 35 U.S.C. 154(b) by 0 days.

(21) Appl. No.: 15/380,392

(22) Filed: Dec. 15, 2016

(51) Int. Cl.
| | |
|---|---|
| *B60J 7/00* | (2006.01) |
| *B60G 99/00* | (2010.01) |
| *B62D 24/04* | (2006.01) |
| *B62D 33/06* | (2006.01) |

(52) U.S. Cl.
CPC ........... *B60G 99/002* (2013.01); *B62D 24/04* (2013.01); *B62D 33/0608* (2013.01); *B60G 2204/162* (2013.01); *B60G 2204/4302* (2013.01)

(58) Field of Classification Search
CPC .... F41B 11/62; F41A 3/56; F41A 3/84; F41A 5/12; A61F 2002/30556; B60N 2/4686; B60N 3/002; E02F 9/2004; B60R 7/04; B64D 11/06
USPC ...................................................... 296/190.07
See application file for complete search history.

(56) References Cited

U.S. PATENT DOCUMENTS

| | | | | |
|---|---|---|---|---|
| 3,948,341 | A * | 4/1976 | Foster ................... | B62D 33/07 180/89.15 |
| 4,871,189 | A * | 10/1989 | Van Breemen ........ | B60G 11/30 180/89.12 |
| 5,967,597 | A * | 10/1999 | Vander Kooi ....... | B60G 99/004 180/89.13 |
| 6,073,714 | A | 6/2000 | McHorse et al. | |
| 6,109,381 | A * | 8/2000 | Stuyvenberg ...... | B62D 33/0608 180/89.12 |
| 6,206,121 | B1 * | 3/2001 | Michel ................. | B60G 17/025 180/89.13 |
| 6,540,038 | B2 | 4/2003 | Taylor | |
| 7,140,669 | B2 * | 11/2006 | Bollinger ............... | B62D 21/02 180/89.14 |
| 7,216,925 | B1 * | 5/2007 | Abele ................ | B62D 33/0608 180/89.13 |
| 7,232,180 | B2 * | 6/2007 | Biasiotto ............ | B62D 33/0604 180/89.14 |

(Continued)

*Primary Examiner* — Kiran B Patel
(74) *Attorney, Agent, or Firm* — Dennis L. Thomte; Thomte Patent Law Office LLC

(57) ABSTRACT

A height control linkage for a vehicle cab suspension comprising upper and lower linkage members which are adjustably joined by a barrel assembly including first and second barrel members which are selectively joined together. The upper linkage member includes a laterally facing socket and a shaft portion which extends therefrom with the shaft portion having a plurality of alternating and spaced-apart annular grooves and ridges which are rotatably secured to the upper ends of the barrel members. The lower linkage member includes a laterally facing socket and a threaded shaft extending upwardly therefrom which is adjustably threadably secured to the lower ends of the barrel members. The length of the height control linkage may be changed by threadably rotating the barrel assembly with respect to the lower linkage member.

14 Claims, 7 Drawing Sheets

(56) References Cited

U.S. PATENT DOCUMENTS

| | | | | |
|---|---|---|---|---|
| 9,283,993 B2* | 3/2016 | Rager | ................... | B62D 24/04 |
| 2007/0267894 A1* | 11/2007 | Van Den Brink | . | B62D 33/0604 |
| | | | | 296/190.07 |
| 2009/0085377 A1* | 4/2009 | Hayes | ................ | B62D 33/0604 |
| | | | | 296/190.07 |
| 2011/0266727 A1* | 11/2011 | Knevels | ............. | B62D 33/0608 |
| | | | | 267/64.24 |
| 2015/0344083 A1* | 12/2015 | Safiejko | ............. | B62D 33/0608 |
| | | | | 296/190.07 |

\* cited by examiner

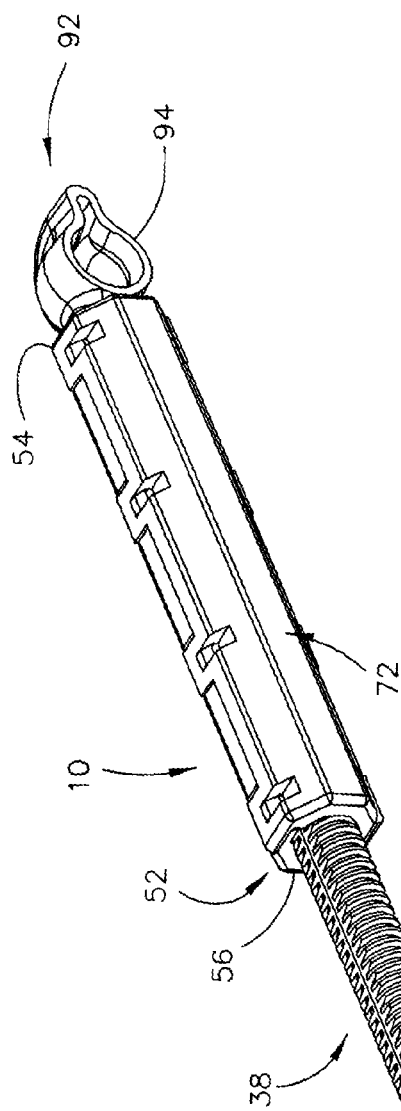
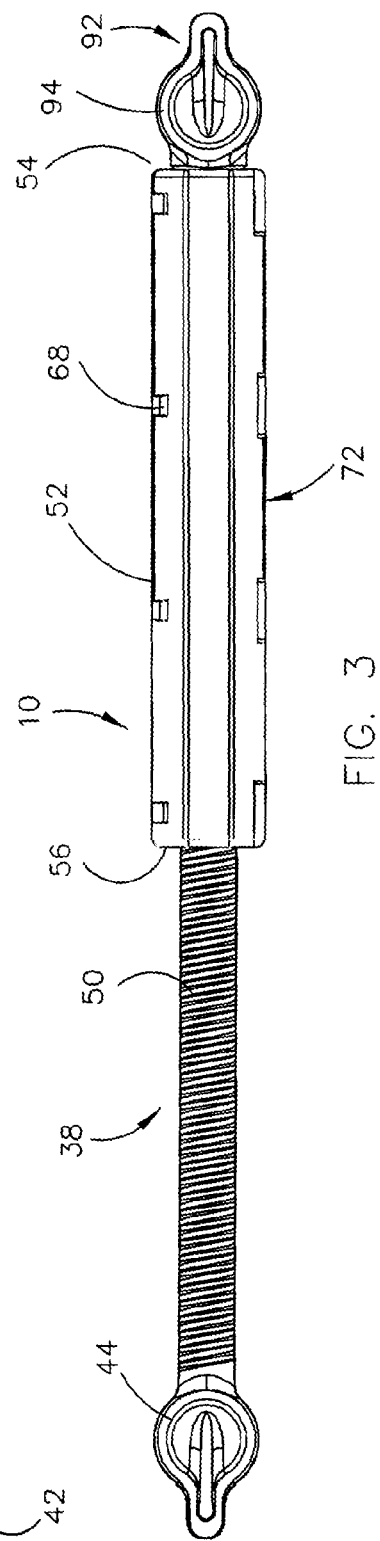
FIG. 2
FIG. 3

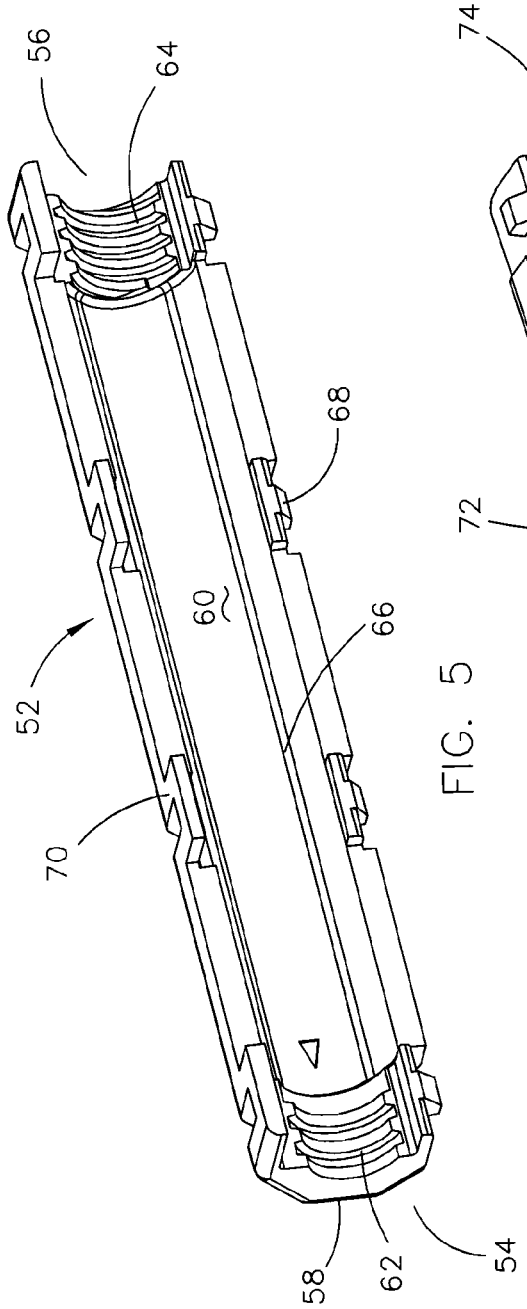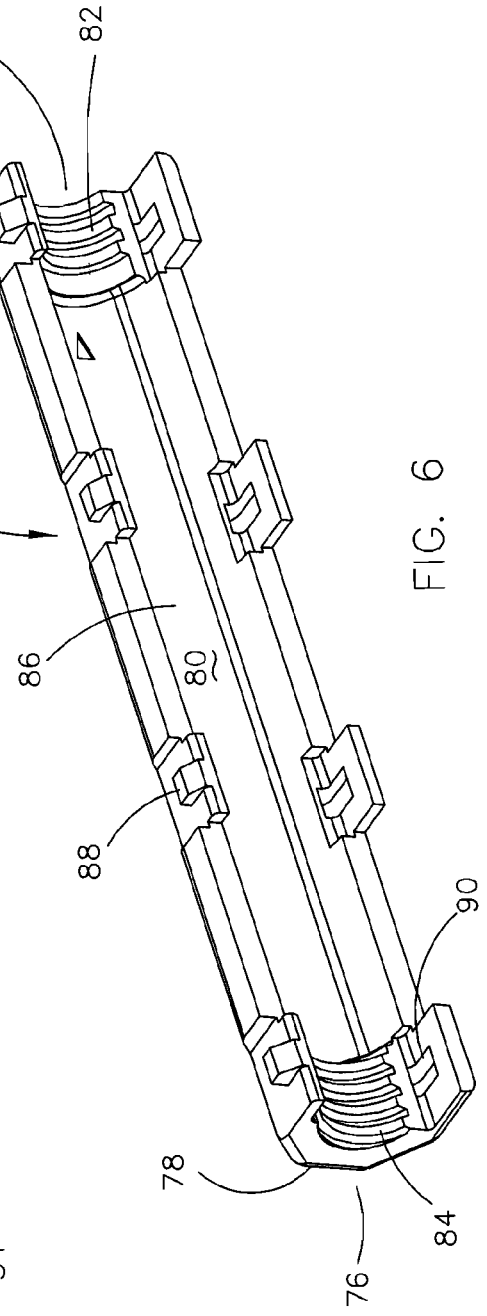

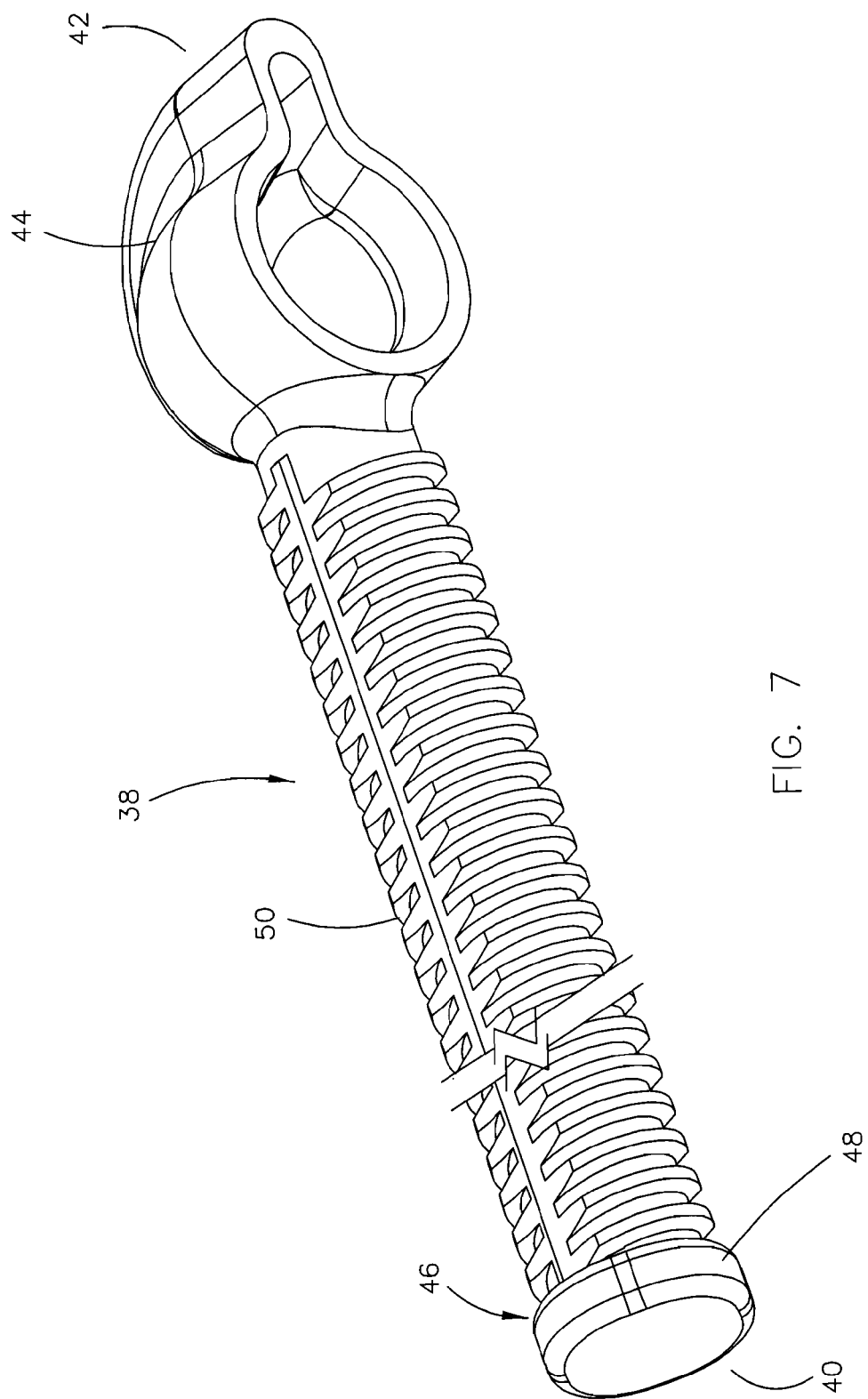

HEIGHT CONTROL LINKAGE FOR A VEHICLE CAB SUSPENSION SYSTEM

BACKGROUND OF THE INVENTION

Field of the Invention

This invention relates to a height control linkage for a vehicle cab suspension system and more particularly to a height control linkage for a vehicle cab suspension system comprised of lower and upper linkage members with the lower linkage member being able to be adjustably longitudinally secured to the upper linkage member. Although the height control linkage is primarily designed to be used with cab suspension systems, it may also be used with vehicle chassis suspension systems.

Description of the Related Art

Many vehicle cab suspensions have been previously provided for supporting a vehicle cab on the chassis of the vehicle whereby a cushioning or shock absorber effect is achieved to provide a more comfortable ride for the occupant or occupants of the cab. Further, many vehicle cab suspensions have been previously provided for adjusting the height of the rear of the cab depending upon the weight of the occupants, etc., within the cab. For example, see U.S. Pat. No. 6,540,038 wherein a vehicle cab suspension system is disclosed including a pair of air bags or air springs which are positioned between the rear of the cab and the truck frame with the air bags being inflatably adjustable to exert an upward force against the underside of the cab. In the device of the '038 patent, the air pressure within the air springs therein may be adjusted through a displacement sensitive valve which is actuated by a selectively length adjustable rod arm. The rod arm or height control linkage of the '038 patent, and in similar prior art designs, requires that in the assembly of the rod arm or height control linkage, prior to installation, one linkage member must be screwed into the other linkage member with lock nuts then being tightened to maintain that length. If one of the linkage members is threadably moved with respect to another, the length of the rod arm changes. It is believed that the assembly of the rod arm of the '038 patent is time-consuming and ergonomically disadvantageous.

A generally similar device to that of the '038 patent is disclosed in U.S. Pat. No. 6,073,714 which includes a linkage arm which is connected to the leveler valve control arm. It is believed that the linkage of the '714 patent suffers the same drawbacks as that of the '038 structure.

The assignee of the present invention received U.S. Pat. No. 7,216,925 which represented a significant advance in the art. The present invention represents a further advancement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A height control linkage for a vehicle cab suspension is disclosed which is directed to a linkage which is operably secured to and extends between the upper frame member and the actuator of the vehicle. The linkage of this invention includes a lower linkage member, an upper linkage member and a barrel which connects the lower and upper linkage members. The lower linkage member is elongated and has upper and lower ends and which has an externally threaded portion formed therein between its upper and lower ends. The lower linkage member has a laterally facing socket at the lower end thereof. The lower linkage member has a generally flat oblong-shaped member at its upper end. The barrel of the linkage includes an elongated and generally C-shaped first barrel member having an upper end, a lower end, an outer side and an inner side. The inner side of the first barrel member has an upper portion which has spaced-apart alternating annular ridges and grooves formed therein. The inner side of the first barrel member has a lower portion which has internal threads formed therein. The upper and lower portions of the inner side of the first barrel member are spaced-apart thereby defining a central portion of the inner side of the first barrel member. The central portion of the inner side of the first barrel member has a generally semi-oblong configuration.

The barrel of the linkage also includes an elongated and generally C-shaped second barrel member having an upper end, a lower end, an outer side and an inner side. The inner side of the second barrel member has an upper portion which has spaced-apart alternating annular ridges and grooves formed therein. The inner side of the second barrel member has a lower portion which has internal threads formed therein. The upper and lower portions of the inner side of the second barrel member are spaced-apart thereby defining a central portion of the inner side of the second barrel member. The central portion of the inner side of the second barrel member has a generally semi-oblong configuration. The first and second barrel members are identical.

The upper linkage member has upper and lower ends. The upper linkage member has a laterally facing socket at its upper end. The upper linkage member has external, vertically spaced-apart alternating annular ridges and grooves formed therein at its lower end.

The first and second barrel members are configured to be selectively removably secured together to form a barrel wherein the upper, central and lower portions of the first barrel member register or are aligned with the upper, central and lower portions of the second barrel member.

The lower end of the upper linkage member is positioned between the first and second barrel members, when the first and second barrel members are secured together, whereby the alternating and spaced-apart annular ridges and grooves on the lower end of the upper linkage member mate with the alternating and spaced-apart annular ridges and grooves on the inner sides of the upper ends of the first and second barrel members whereby the upper linkage member is rotatable with respect to the barrel and vice versa.

The upper end of the lower linkage member is positioned between the first and second barrel members when they are secured together whereby the externally threaded portion of the lower linkage member is positioned between the first and second barrel members whereby the external threaded portion of the lower linkage member is threadably mounted in the internal threads of the inner sides of the first and second barrel members so that rotation of the barrel with respect to the lower linkage member will cause relative longitudinal movement between the barrel and lower linkage member.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a perspective view of the height control linkage of this invention;

FIG. 3 is a side view of the height control linkage of this invention;

FIG. 5 is a perspective view of one of the barrel members of the height control linkage of this invention;

FIG. 6 is a perspective view of the other barrel members of the height control linkage of this invention;

FIG. 7 is a partial perspective view of the lower linkage member of the height control linkage of this invention;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
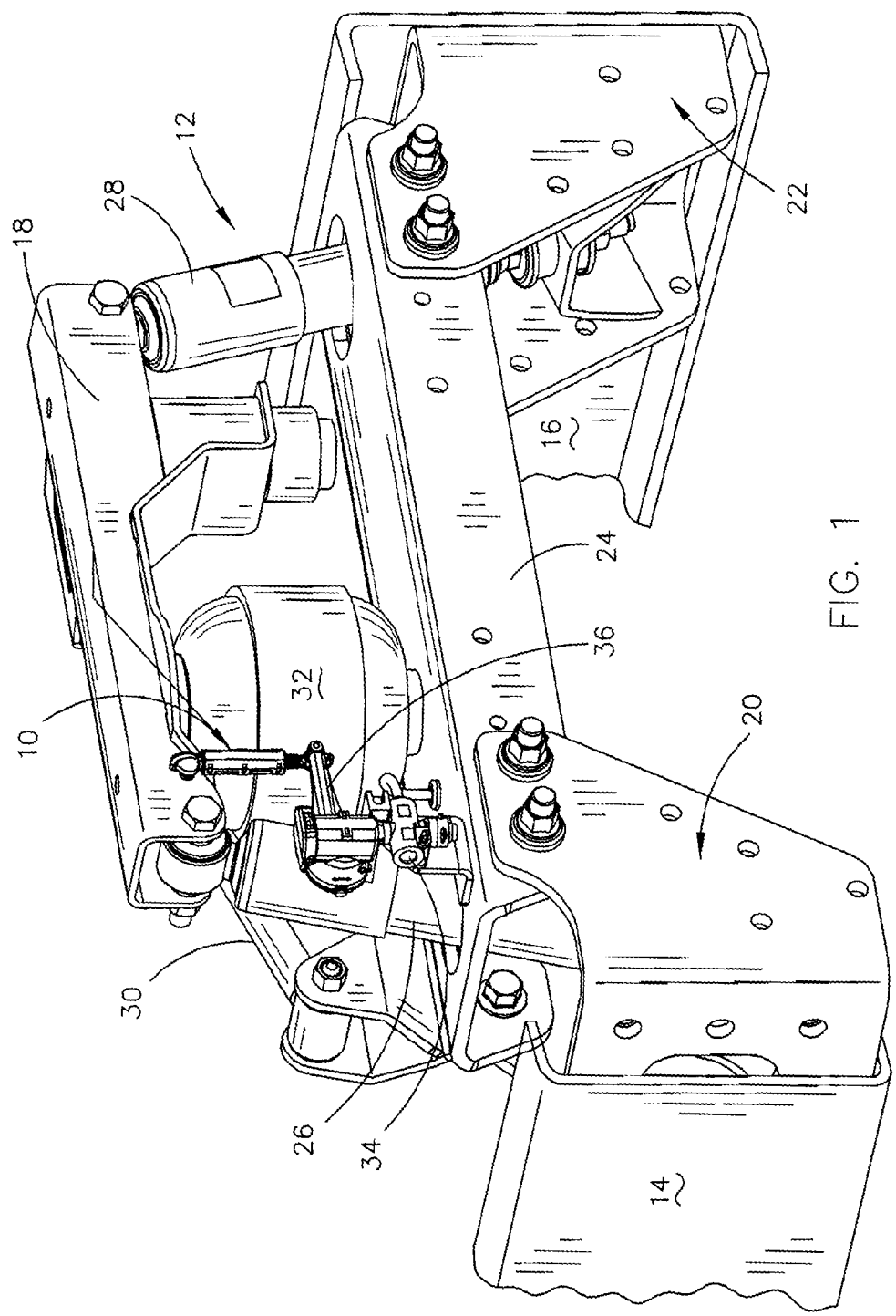
FIG. 1 is a perspective view illustrating the height control linkage of this invention being used in a cab suspension system.
Figure 4:
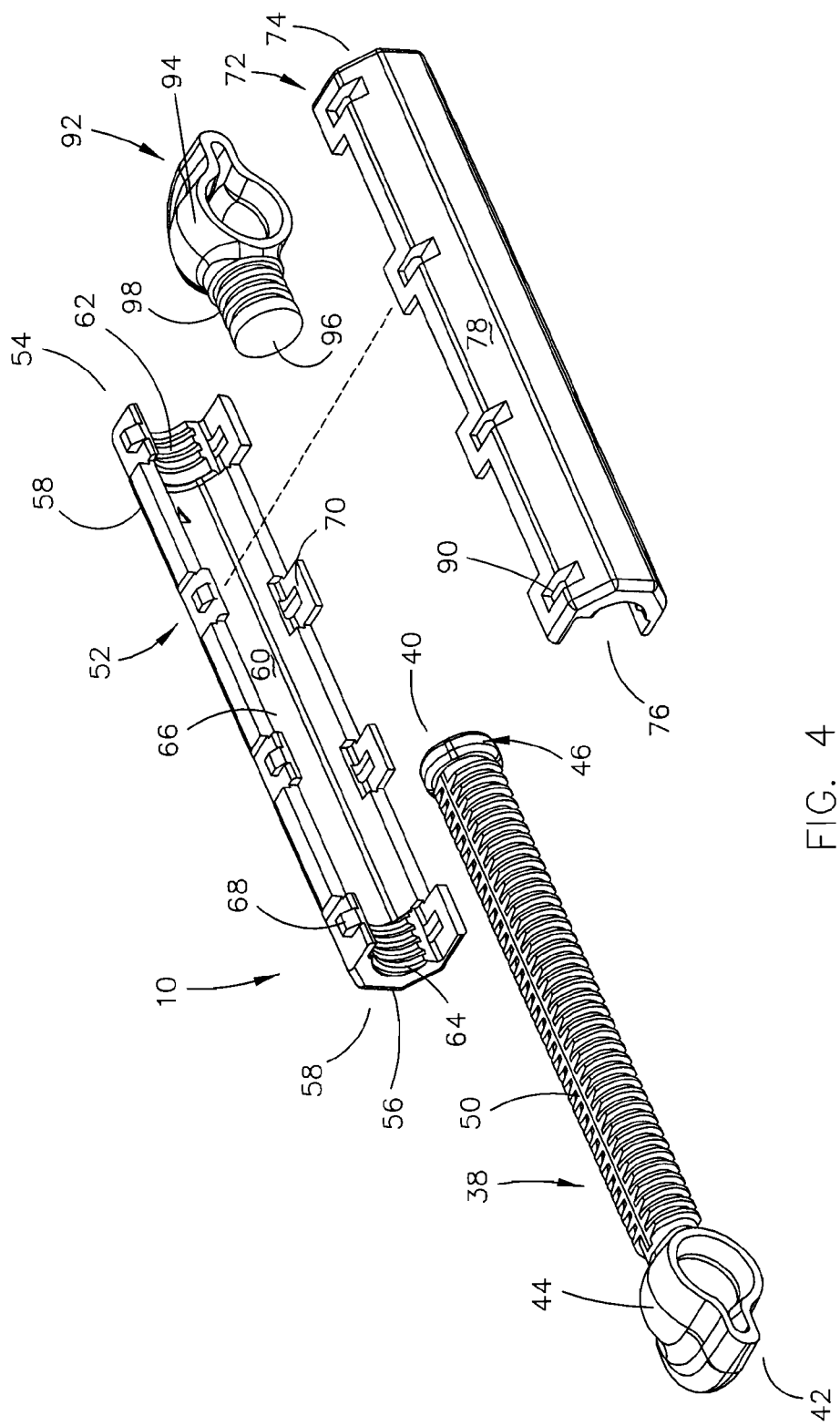
FIG. 4 is an exploded perspective view of the height control linkage of this invention.
Figure 8:
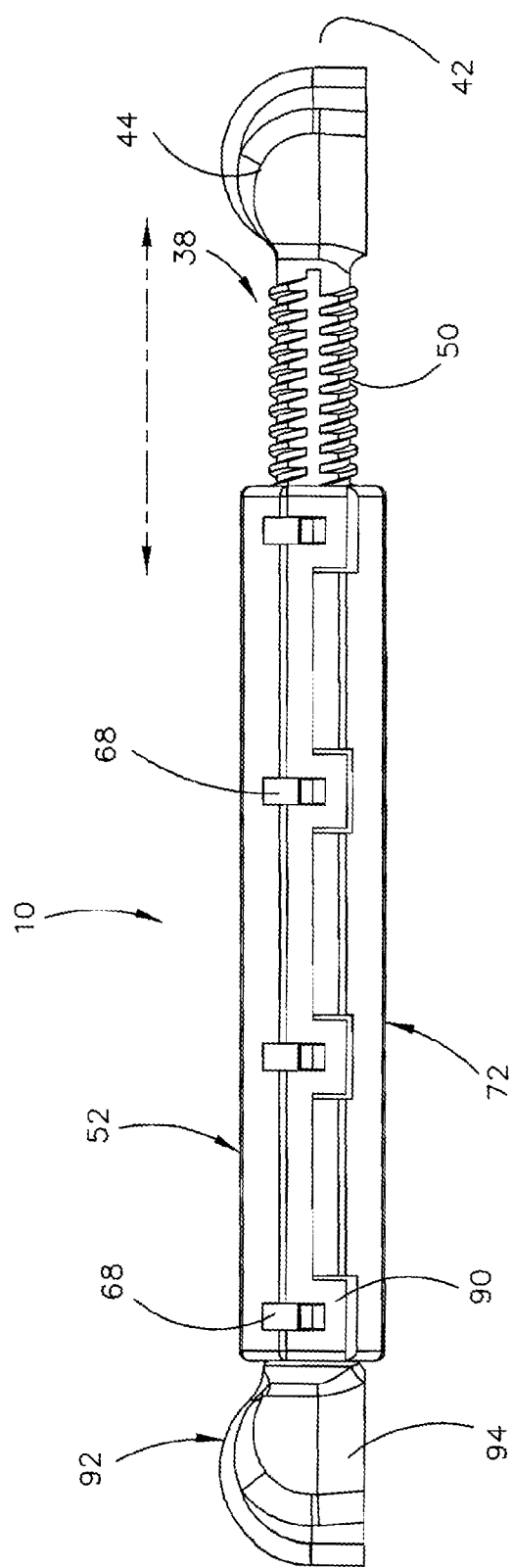
FIG. 8 is a side view of the height control linkage of this invention which illustrates that the lower linkage member of the height control linkage is longitudinally adjustably movable with respect to the upper linkage member and barrel of the height control linkage of this invention.
Figure 9B:
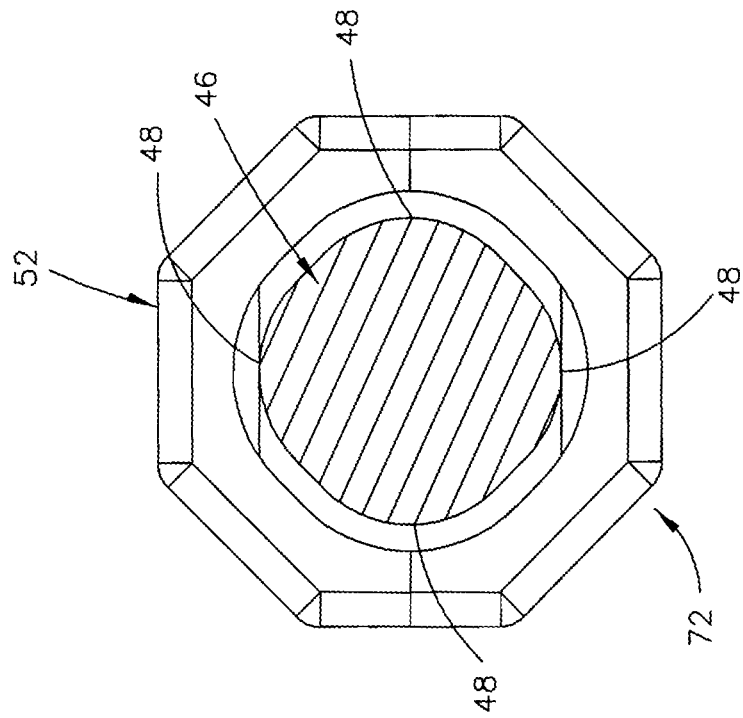
FIGS. 9A and 9B are sectional views which illustrate the manner in which the lower linkage member may be rotated with respect to the barrel of the height control linkage of this invention.
Figure 9A:
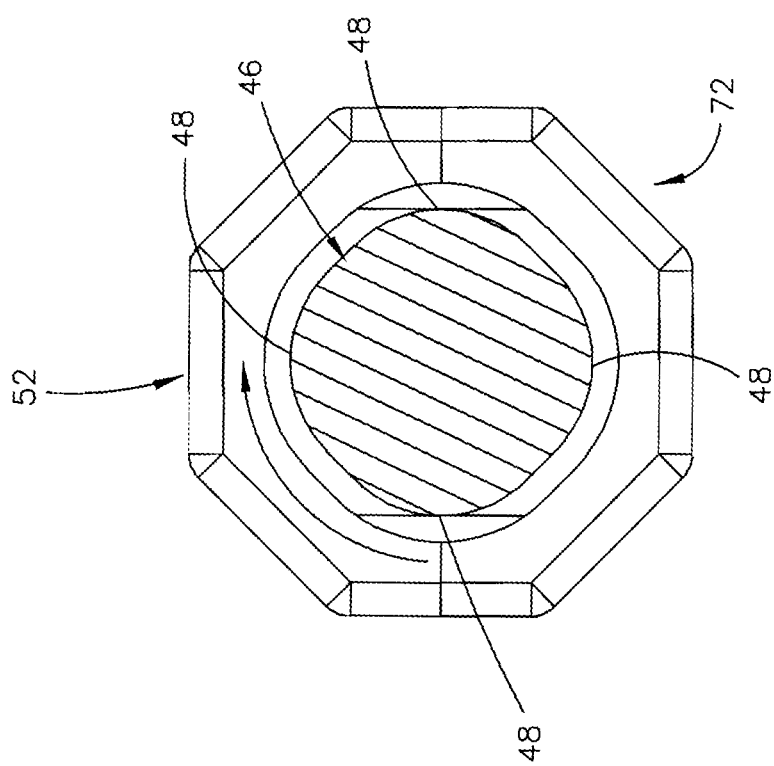

The numeral 10 refers to the height control linkage of this invention which is designed to be used with a prior art vehicle cab suspension system 12 as seen in FIG. 1. The prior art vehicle suspension system 12 is designed to be used at the rearward end of a vehicle cab between the cab and the chassis or frame of a vehicle to provide relative vertical movement therebetween. Normally, the forward end of the cab is pivotally secured to the chassis at a pair of spaced-apart locations whereby the cab may pivot, about a horizontal axis, with respect to those pivot locations. The vehicle upon which the cab is mounted normally consists of a pair of frame rails 14 and 16 which are shown in FIG. 1 in dashed lines. The prior art vehicle cab suspension system 12 includes an upper frame member or sill 18 which is secured to the rear end of the cab in conventional fashion. Brackets 20 and 22 are secured to the frame rails 14 and 16, respectively, and have a frame member 24 secured thereto and extending therebetween at the upper ends thereof.

Shock absorber 26 extends between bracket 20 and one end of the frame member 18 while shock absorber 28 extends between bracket 22 at the other end of frame member 18. A torsion bar 30 is also preferably included. One or more air springs 32 are positioned between frame members 18 and 24 and are adjustably inflatable so as to exert upward force against the frame member 18 and thus the cab.

Air spring 32 is operatively connected to a source of pressurized or compressed air in conventional fashion through a control valve 34 which has a conventional actuator or arm 36 pivotally secured thereto as will be described in detail hereinafter. Linkage 10 has its lower end pivotally secured to the outer end of arm 36 and has its upper end pivotally secured to frame member 18. The linkage 10 is provided for controlling the inflation or deflation of the air spring 32. Linkage 10 is designed to replace the prior art linkages of the prior art cab suspensions.

Linkage 10 is comprised of a plastic material and includes a lower linkage member 38 having an upper end 40 and a lower end 42. The lower linkage member 38 has a laterally facing socket 44 at the lower end thereof. The lower linkage member 38 has a generally flat oblong-shaped member 46 mounted at the upper end thereon. The member 46 includes a plurality of spaced-apart and slightly protruding portions 48 which are spaced-apart 90 degrees. Lower linkage member 38 has a threaded portion 50 formed therein between its upper and lower ends.

The numeral 52 refers to an elongated and generally C-shaped first barrel member having an upper end 54, a lower end 56, an outer side 58 and an inner side 60. The inner side 60 of barrel member 52 has a semi-circular upper portion which has spaced-apart alternating annular grooves and ridges 62 formed therein. The inner side 60 of barrel member 52 has a semi-circular lower portion which has threads 64 formed therein. The upper and lower portions 62 and 64 of barrel member 52 define a central portion 66 which has a generally semi-oblong configuration. Barrel member 52 also includes a plurality of spaced-apart male connector elements 68 at one side edge thereof and has a plurality of spaced-apart female connector elements 70 at its other side edge.

The numeral 72 refers to an elongated and generally C-shaped second barrel member having an upper end 74, a lower end 76, an outer side 78 and an inner side 80. The inner side of barrel member 72 has a semi-circular upper portion which has spaced-apart alternating annular grooves and ridges 82 formed therein. The inner side 80 of barrel member 72 has a semi-circular lower portion which has threads 84 formed therein. The upper and lower portions 82 and 84 of barrel member 72 define a central portion 86 which has a generally semi-oblong configuration. Barrel member 72 also includes a plurality of spaced-apart male connector elements 88 and one side edge thereof and has a plurality of spaced-apart female connector elements 90 at the other side edge. The barrel members 52 and 72 are identical.

The numeral 92 refers to the upper linkage member of this invention. Upper linkage member 92 includes a lateral facing socket 94 and a shaft portion 96 which extends downwardly therefrom. Shaft portion 96 has a plurality of alternating and spaced-apart grooves and ridges 98 formed thereon.

The linkage 10 may be easily assembled to any required length by spacing the sockets 44 and 100 at a predetermined length and then clamping the barrel members 52 and 72 together to form a barrel whereby the male connector elements 68 of barrel member 52 will be received by and attached to the female connector elements 90 of barrel member 72 and so that the male connector elements 88 of barrel member 72 will be received by and secured to the female connector elements 70 of barrel member 52.

When barrel members 52 and 72 are clamped together, the ridges and grooves 98 of upper linkage member 92 are rotatably received by the ridges and grooves 54 in barrel member and are rotatably received by the ridges and grooves 82 in barrel member 72 whereby upper linkage member 92 and the clamped together barrel members 52 and 72 are rotatably connected together.

When barrel members 52 and 72 are clamped together, the threaded portion 50 of lower linkage member is threadably received by the threaded portion 64 of barrel member 52 and the threaded portion 84 of barrel member 72. The rotation connection of upper linkage member 92 allows socket 94 to be able to be rotated 360 degrees with respect to the remainder of the linkage 10. Once assembled, the linkage length is easily adjustable without disassembly of the linkage 10. The lower linkage 38, by its threaded connection to barrel members 52 and 72, allows the length of the linkage 10 to be adjusted by rotating the barrel members 52 and 72. The outer side of the barrel members 52 and 72, when assembled, have an octagonal shape that permits a wrench to be used to rotate the barrel comprised of barrel members 52 and 72, with respect to the lower linkage member 38.

When the linkage 10 is assembled, the octagonal surfaces of the oblong periphery of member 46 yieldably engage the oblong surfaces of the central portions of barrel members 52 and 72 to yieldably prevent the rotation of the barrel members 52 and 72 with respect to the lower linkage member 38. The adjustment of barrel members 52 and 72 with respect to lower linkage member 38 comes from forcing the oblong surfaces to pass each other as the linkage member 38 goes into or out of barrel members 52 and 72. The plastic construction of barrel members 52 and 72 allows for the protruding surfaces of the central portions of the barrel members to pass over the protruding surfaces of the oblong member.

Thus it can be seen that a unique height control linkage has been provided for use with a vehicle cab suspension which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
   a vehicle including a frame having rearward and forward ends, a cab, having rearward and forward ends, movably supported upon said frame whereby said rearward end of said cab may move upwardly and downwardly with respect to said frame;
   a cab suspension system positioned at said rearward end of said cab for exerting an upward force upon said cab;
   said cab suspension system comprising a lower frame member secured to said vehicle frame, an upper frame member secured to said cab, an adjustable inflatable air spring positioned between said upper and lower frame members for exerting an upward force upon said cab, said air spring being in communication with a source of air under pressure, an air valve operatively fluidly connected to said air spring which controls the flow of pressurized air into and out of said air spring, said air valve including an actuator;
   a linkage operably secured to and extending between said upper frame member and said actuator;
   said linkage comprising:
   an elongated lower linkage member having upper and lower ends;
   said lower linkage member having an externally threaded portion formed therein between said upper and lower ends thereof;
   said lower linkage member having a laterally facing socket at said lower end of said lower linkage member;
   said lower linkage member having a generally flat double oblong-shaped member at its said upper end;
   an elongated and generally C-shaped first barrel member having an upper end, a lower end, an outer side and an inner side;
   said inner side of said first barrel member having an upper portion which has spaced-apart alternating annular ridges and grooves formed therein;
   said inner side of said first barrel member having a lower portion which has internal threads formed therein;
   said upper and lower portions of said inner side of said first barrel member being spaced-apart thereby defining a central wall portion of said inner side of said first barrel member;
   said central wall portion of said inner side of said first barrel member having a generally semi-oblong cross-sectional configuration;
   an elongated and generally C-shaped second barrel member having an upper end, a lower end, an outer side and an inner side;
   said inner side of said second barrel member having an upper portion which has spaced-apart alternating annular ridges and grooves formed therein;
   said inner side of said second barrel member having a lower portion which has internal threads formed therein;
   said upper and lower portions of said inner side of said second barrel member being spaced-apart thereby defining a central wall portion of said inner side of said second barrel member;
   said central portion of said inner side of said second barrel member having a generally semi-oblong cross-sectional configuration;
   said first and second barrel members being configured to be selectively removably secured together to form a barrel wherein said upper and lower portions of said first barrel member register with said upper and lower portions of said second barrel member;
   an upper linkage member having upper and lower ends;
   said upper linkage member having a laterally facing socket at its said upper ends;
   said upper linkage member having external, vertically spaced-apart, alternating annular ridges and grooves formed therein at its said lower end;
   said lower end of said upper linkage member being positioned between said upper ends of said first and second barrel members, when said first and second barrel members are secured together, whereby said alternating and spaced-apart annular ridges and grooves on said lower end of said upper linkage member mate with said alternating and spaced-apart annular ridges and grooves on said inner sides of said upper ends of said first and second barrel members whereby said upper linkage member is rotatable with respect to said barrel;
   said upper end of said lower linkage member being positioned between said first and second barrel members when said first and second barrel members are secured together whereby said externally threaded portion of said lower linkage member is threadably mounted in said internal threads of said inner sides of said first and second barrel members so that rotation of said barrel with respect to said lower linkage member will cause relative longitudinal movement between said barrel and said lower linkage member.

2. The combination of claim 1 wherein said barrel has an octagonal outer surface.

3. The combination of claim 1 wherein said first and second barrel members, said upper linkage member and said lower linkage member are comprised of a plastic material.

4. The combination of claim 1 wherein said upper linkage member may be rotated with respect to said barrel without changing the length of the linkage.

5. A linkage for use with a vehicle cab suspension system, comprising:
  said linkage comprising:
  an elongated lower linkage member having upper and lower ends;
  said lower linkage member having an externally threaded portion formed therein between said upper and lower ends thereof;
  said lower linkage member having a laterally facing socket at said lower end of said lower linkage member;
  said lower linkage member having a generally enlarged head portion at said upper end of said lower linkage member which has a diameter greater than the diameter of said externally threaded portion of said lower linkage member;
  an elongated and generally C-shaped first barrel member having an upper end, a lower end, an outer side and an inner side;
  said inner side of said first barrel member having an upper portion which has spaced-apart alternating annular ridges and grooves formed therein;
  said inner side of said first barrel member having a lower portion which has internal threads formed therein;
  said upper and lower portions of said inner side of said first barrel member being spaced-apart thereby defining a central wall portion of said inner side of said first barrel member;
  an elongated and generally C-shaped second barrel member having an upper end, a lower end, an outer side and an inner side;
  said inner side of said second barrel member having an upper portion which has spaced-apart alternating annular ridges and grooves formed therein;
  said inner side of said second barrel member having a lower portion which has internal threads formed therein;
  said upper and lower portions of said inner side of said second barrel member being spaced-apart thereby defining a central wall portion of said inner side of said second barrel member;
  said first and second barrel members being configured to be selectively removably secured together to form a barrel wherein said upper and lower portions of said first barrel member register with said upper and lower portions of said second barrel member;
  an upper linkage member having upper and lower ends;
  said upper linkage member having a laterally facing socket at its said upper ends;
  said upper linkage member having external, vertically spaced-apart, alternating annular ridges and grooves formed therein at its said lower end;
  said lower end of said upper linkage member being positioned between said upper ends of said first and second barrel members, when said first and second barrel members are secured together, whereby said alternating and spaced-apart annular ridges and grooves on said lower end of said upper linkage member mate with said alternating and spaced-apart annular ridges and grooves on said inner sides of said upper ends of said first and second barrel members whereby said upper linkage member is rotatable with respect to said barrel; and
  said upper end of said lower linkage member being positioned between said first and second barrel members when said first and second barrel members are secured together whereby said externally threaded portion of said lower linkage member is threadably mounted in said internal threads of said inner sides of said first and second barrel members so that rotation of said barrel with respect to said lower linkage member will cause relative longitudinal movement between said barrel and said lower linkage member.

6. The linkage of claim 5 wherein said enlarged head portion of said lower linkage member yieldably rotatably engages said central wall portions of said first and second barrel members to yieldably prevent rotation of said barrel with respect to said lower linkage member.

7. The linkage of claim 6 wherein said enlarged head portion of said lower linkage member has a generally oblong shape and wherein said central wall portions of said first and second barrel members have a semi-oblong shape.

8. The linkage of claim 5 wherein said barrel has an octagonal-shaped outer side.

9. The linkage of claim 5 wherein said lower linkage member, said barrel and said upper linkage member are comprised of a plastic material.

10. A linkage for use with a vehicle chassis suspension system, comprising:
  said linkage comprising:
  an elongated lower linkage member having upper and lower ends;
  said lower linkage member having an externally threaded portion formed therein between said upper and lower ends thereof;
  said lower linkage member having a laterally facing socket at said lower end of said lower linkage member;
  said lower linkage member having a generally enlarged head portion at said upper end of said lower linkage member which has a diameter greater than the diameter of said externally threaded portion of said lower linkage member;
  an elongated and generally C-shaped first barrel member having an upper end, a lower end, an outer side and an inner side;
  said inner side of said first barrel member having an upper portion which has spaced-apart alternating annular ridges and grooves formed therein;
  said inner side of said first barrel member having a lower portion which has internal threads formed therein;
  said upper and lower portions of said inner side of said first barrel member being spaced-apart thereby defining a central wall portion of said inner side of said first barrel member;
  an elongated and generally C-shaped second barrel member having an upper end, a lower end, an outer side and an inner side;
  said inner side of said second barrel member having an upper portion which has spaced-apart alternating annular ridges and grooves formed therein;

said inner side of said second barrel member having a lower portion which has internal threads formed therein;

said upper and lower portions of said inner side of said second barrel member being spaced-apart thereby defining a central wall portion of said inner side of said second barrel member;

said first and second barrel members being configured to be selectively removably secured together to form a barrel wherein said upper and lower portions of said first barrel member register with said upper and lower portions of said second barrel member;

an upper linkage member having upper and lower ends;

said upper linkage member having a laterally facing socket at its said upper ends;

said upper linkage member having external, vertically spaced-apart, alternating annular ridges and grooves formed therein at its said lower end;

said lower end of said upper linkage member being positioned between said upper ends of said first and second barrel members, when said first and second barrel members are secured together, whereby said alternating and spaced-apart annular ridges and grooves on said lower end of said upper linkage member mate with said alternating and spaced-apart annular ridges and grooves on said inner sides of said upper ends of said first and second barrel members whereby said upper linkage member is rotatable with respect to said barrel; and said upper end of said lower linkage member being positioned between said first and second barrel members when said first and second barrel members are secured together whereby said externally threaded portion of said lower linkage member is threadably mounted in said internal threads of said inner sides of said first and second barrel members so that rotation of said barrel with respect to said lower linkage member will cause relative longitudinal movement between said barrel and said lower linkage member.

11. The linkage of claim 10 wherein said enlarged head portion of said lower linkage member yieldably rotatably engages said central wall portions of said first and second barrel members to yieldably prevent rotation of said barrel with respect to said lower linkage member.

12. The linkage of claim 11 wherein said enlarged head portion of said lower linkage member has a generally oblong shape and wherein said central wall portions of said first and second barrel members have a semi-oblong shape.

13. The linkage of claim 10 wherein said barrel has an octagonal-shaped outer side.

14. The linkage of claim 10 wherein said lower linkage member, said barrel and said upper linkage member are comprised of a plastic material.

\* \* \* \* \*